Feb. 28, 1956  H. A. WILCOX  2,736,307

PREOILING SYSTEM AND APPARATUS

Filed July 24, 1953

INVENTOR:
HARRY A. WILCOX

BY

Watson Johnson Leavenworth & Blair
ATTORNEYS

United States Patent Office 2,736,307
Patented Feb. 28, 1956

2,736,307

PREOILING SYSTEM AND APPARATUS

Harry A. Wilcox, Westport, Conn.

Application July 24, 1953, Serial No. 370,126

6 Claims. (Cl. 123—196)

This invention relates to improved means and method for lubricating engines and more particularly to a preoiling system and apparatus for supplying lubricant fluid under pressure to the moving parts of an internal combustion engine immediately prior to starting.

An object of the invention is to reduce the friction and wear which normally occur between engine parts during the first few revolutions of the crank shaft in response to the starting motor before normal oil pressure has developed in the conventional engine lubricating system.

Another object of the invention is to facilitate starting and reduce wear in internal combustion engines, particularly when such engines are cold or have been idle for a period of time.

Other objects and advantages of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure.

The method by which the objects of the invention are attained involves releasing into the oil gallery of an engine immediately preceding starting the engine, engine lubricating oil stored under pressure in a reservoir and replacing the stored quantity of oil under the desired pressure from the conventional engine lubricating system after starting. A feature of the invention resides in the storage, release and replacement of lubricating oil under pressure greater than the pressure prevailing in the conventional engine lubricating system while the engine is in operation.

Figure 1:
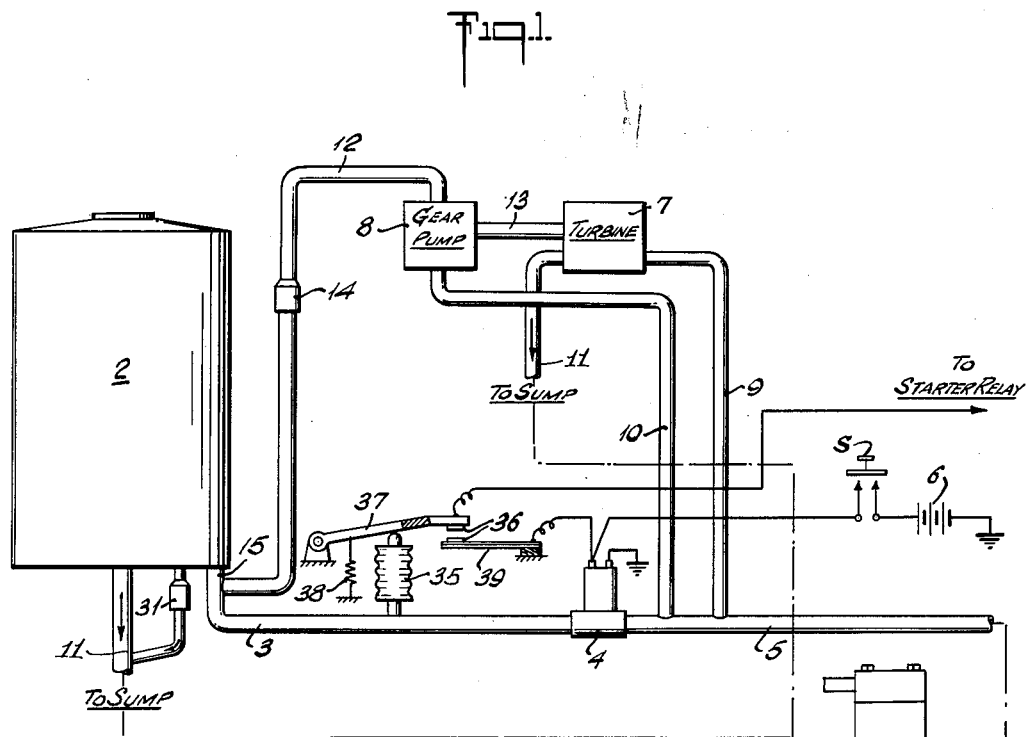
Figure 2:
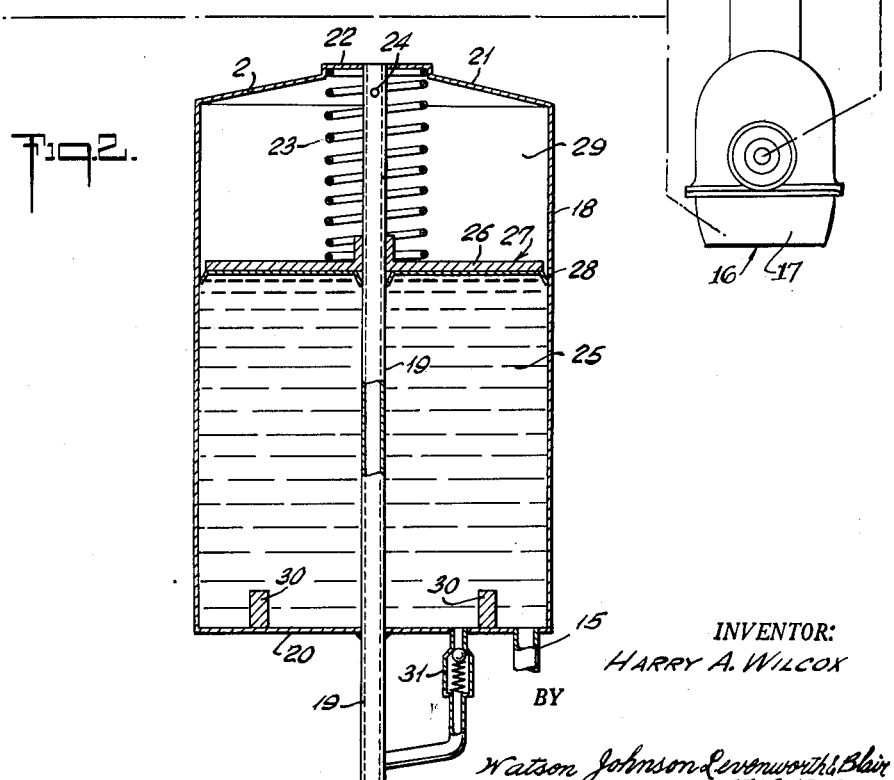

For further understanding of the nature and objects of the invention and the method of operation, reference should be had to the following detailed description taken in connection with the accompanying drawing, in which:

Fig. 1 is a schematic representation of the lubricating system of the invention diagrammatically depicting an internal combustion engine with portions of connecting conduit lines broken away, the courses of the latter being indicated in dot-dash lines; and Fig. 2 is an enlarged cross-sectional view, taken along the vertical center line, of the reservoir of Fig. 1 in which pre-starting lubricant fluid is stored under pressure.

Referring now in greater detail to the disclosure of Fig. 1, the oil pressure reservoir indicated generally at 2 is connected by pipe 3 through an electrically operated valve 4 to pipe 5, which leads to the oil gallery of an engine diagrammatically indicated at 16. This gallery is connected with parts of the engine to be lubricated and during engine operation is supplied with oil under pressure from the conventional engine lubricating system. Electrically controlled valve 4 is normally closed and opens only when energized by operation of the engine starting switch S, which completes a circuit from the starting battery 6 through the usual solenoid housed in the shown superstructure housing of valve 4 to ground.

The usual engine driven oil pump (not shown) supplies oil to the conventional engine lubricating system, delivering oil under normal oil pressure from the oil sump indicated generally at 17 to the oil gallery to provide lubricating oil at normal oil pressure to the oil gallery and thus to parts of the engine to be lubricated when the engine is running.

As shown in Fig. 1, a turbine 7 and a gear pump 8 are connected to pipe 5, through pipes 9 and 10 respectively. The turbine 7 is adapted to be operated by normal oil pressure from the engine oil pump when the engine is running. Exhaust oil from the turbine is returned to the sump through a branch of return line or pipe 11.

The gear pump 8 is adapted to be driven by the turbine 7 through the shaft 13, which rotates in response to operation of turbine 7. When the gear pump 8 is thus operated, it pumps oil from line 10 at normal engine oil pressure into line 12 at a greater pressure, through check valve 14 and into pipe line 3. Since the valve 4 is closed when the engine is operating, this high pressure oil in line 12 cannot flow through line 3 into line 5 and to the engine oil gallery but can only pass into the reservoir 2 through the entrance port 15.

Referring now to Fig. 2 of the drawing, the internal structural details of the pressure reservoir will be described. This reservoir indicated generally at 2, comprises a tank enclosure 18, preferably of cylindrical construction, having a vertical tube 19 centrally disposed within the tank 18. In the preferred embodiment employing a cylindrical tank, the pipe 19 extends vertically along the axis of the cylinder formed by the tank shell. Opposite ends of cylindrical shell 18 are enclosed by a substantially plain bottom 20 and a truncated conical top 21, having a cylindrical end portion 22 in the truncated center thereof to receive one end of a helical compression spring 23 which surrounds the upper end of tube 19. Drilled through the side of the upper portion of tube 19 is an exhaust port 24. The lower end of vertical tube 19, which extends beyond the bottom 20 of reservoir 2, exhausts to the oil sump.

As represented by the horizontal broken lines in Fig. 2, the lower and central internal portion of the reservoir 2 is shown filled with oil 25, which is admitted through the entrance port 15 from pump 8 through pipe line 12 and check valve 14, as described above in reference to Fig. 1 of the drawing. A diaphragm assembly 26, which comprises a metal diaphragm 27 and a flexible gasket member 28, is slidably mounted on the vertical tube 19 between the upper surface of the oil 25 and the lower end of compression spring 23 in such manner that as additional oil is pumped into the entrance port 15, the diaphragm assembly moves upward against the downward pressure of spring 23. The peripheral edge of gasket 28 wipes against the inside surface of the shell 18 while the central edge of the gasket 28 wipes against the outside surface of the central tube 19 to prevent leakage of oil under pressure from space 25 into the space 29 above the diaphragm. Stops 30—30, fastened to the inner surface of the bottom 20, support the diaphragm assembly 26 in its lowermost position when spring 23 is fully distended.

As oil is pumped into the reservoir through entrance port 15, the diaphragm assembly 26 rises and the spring 23 is compressed to exert an ever increasing pressure on the stored oil as the volume of oil is increased. As the diaphragm assembly 26 rises, air in the upper reservoir chamber 29 escapes through exhaust port 24. Similarly oil which may have leaked past diaphragm assembly 26 into space 29 will escape through exhaust port 24 and return to the sump when its level reaches port 24 by reason of raising of the diaphragm assembly. As an additional precaution against the accumulation of excessive pressure within the reservoir 2, a safety valve 31 may be provided in the bottom of the reservoir tank to actuate under predetermined excessive pressure and release oil from the reservoir into the lower end of tube 19, whence it returns to the sump. The predetermined pressure at which safety valve 31 releases should be less than the maximum pressure which the reservoir is designed to withstand.

It will be seen that the reservoir 2 provides a pressure storage, explusive delivery reservoir for the desired quantity of oil. Alternative forms of pressure storage, expulsive delivery reservoir may be employed. One alternative form of such a reservoir may comprise a flexible bag inflated with air or other gases in lieu of the diaphragm assembly 26, the compression spring 23 and the tube 19. This alternative contemplates that a reservoir be constructed containing a flexible inflated or inflatable bag formed of plastic, or other suitable material compatible with oil. Where the bag is to be inflated after positioning in the reservoir, the bag is provided with an inflation connection extending through the wall of the reservoir and suitably valved. Oil pumped into the reservoir through entrance port 15 would compress the gas in the bag, causing the bag to function as a flexible expandable diaphragm permitting pressure storage of oil in the reservoir and expulsive delivery of oil from it.

Another alternative embodiment of a pressure storage expulsive delivery reservoir involves employment of gas confined only by the walls of a reservoir. It will be noted that if tube 19, the diaphragm assembly 26 and spring 23 are omitted from the reservoir, the volume of air in the tank would of necessity be compressed as oil is pumped into the tank and space 29 would contain air under pressure, thus affording another means of storing the necessary quantity of oil under pressure and for expulsively delivering the oil under pressure when valve 4 is opened.

In the embodiment shown in the drawing, assuming that the reservoir 2 has been filled to the desired level with oil under the desired pressure in the manner described hereinabove, the operation of the system in starting an engine, such as that diagrammatically indicated at 16, may be traced by reference to Fig. 1 of the drawing. The static condition before closure of the starting switch will first be described. Neither the conventional engine oil pump (not shown), nor the turbine 7, nor the gear pump 8 is then operative, but a suitable quantity of oil under pressure has been stored in reservoir 2 by the last previous operation of the engine. The check valve 14 prevents escape of this stored oil under pressure through the idle gear pump 8, while the normally closed valve 4 prevents escape of the stored oil into the engine oil gallery.

A pressure responsive means 35, which is open to line 3 and is held in extended position by pressure communicated to it from that line, holds in open position the contact arm 37 against the pressure of spring 38. The electrical contacts 36 connected in series with the engine starting switch and starter relay are thus held in open position. As long as the contacts 36 are held open, closure of the starting switch S cannot operate the starter relay or turn the starter motor. However, closure of switch S does complete a circuit through the solenoid of valve 4 to open that valve and permit the accumulated oil under pressure within reservoir 2 to flow through line 3 and the open valve 4 into line 5 whence it is conducted to the engine oil gallery to lubricate parts of the engine before any motion is imparted to the engine by the starting motor.

Following release of a suitable quantity of oil to the engine the pressure in the reservoir 2, and consequently in line 3, drops to the point that the pressure responsive means 35 can no longer retain its extended position against the tension of spring 38, whereupon the contact arm 37 is pulled downwardly by the tension of spring 38 until the contacts 36 close to complete a circuit from the starting battery 6 through the starting switch S to the starter relay, whereby the starting motor is energized to impart starting movement to the rotating members of the engine. Contacts 36 are suitably insulated to maintain the integrity of the starter circuit. In Fig. 1, pressure responsive means 35 is of bellows type, shown in extended position.

In this manner it may be seen that all of the moving parts of the engine are effectively pre-lubricated by oil under pressure prior to starting the engine.

Once the engine has been started as above described, the conventional engine driven oil pump takes over and maintains normal operating lubrication. As described in detail above, in reference to Fig. 1 of the drawing, this normal engine oil pressure drives the turbine 7 to operate pump 8.

It is preferred that the oil stored in reservoir 2 be so stored under a pressure substantially in excess of the pressure in the conventional lubricating system of the engine. Pressures up to two or three or more times the pressure of the oil in the conventional lubricating system of the engine may be employed. Such an increased pressure of oil stored in reservoir 2 is advantageous in that it permits adequate pre-starting lubrication even when the viscosity of the oil in the cold engine is greatly increased by low atmospheric temperatures.

The turbine 7 and the gear pump 8 shown in the drawing are so designed that the turbine operating under the oil pressure of the conventional engine lubricating system is effective to drive the gear pump until the predetermined desired back pressure on the gear pump in pipe 12, which represents substantially the predetermined desired pressure on the oil in reservoir 2, is attained but is not effective to drive the gear pump against back pressures substantially in excess of the desired predetermined pressure or in excess of the pressure at which safety valve 31 is actuated to release oil from reservoir 2. Such coordination of turbine 7 with gear pump 8 permits uninterrupted replacement of the desired quantity of oil under the desired pressure in reservoir 2 when the engine is operating but permits the turbine and pump to become idle when this pressure has been reached. However, upon substantial reduction of oil pressure in reservoir 2, the turbine and gear pump will be effective to reestablish the desired pressure in the reservoir.

In effect the turbine and gear pump shown in Fig. 1 represent a pressure controlled pumping mechanism adapted to be rendered non-operative upon attainment of the desired pressure in the reservoir. In the instance illustrated in the drawing such pressure control of the pump is attained by coordination of the turbine-pump system, the turbine being incapable under the influence of normal oil pressure of the conventional engine lubricating system of say 40 pounds per square inch to drive the gear pump at minimum pumping speed against a back pressure greater than the predetermined desired maximum pressure in the reservoir of say 90 pounds per square inch.

It will be understood that the same pressure control of the replenishing pump to render it non-operative upon attainment of the desired pressure in the reservoir may be obtained in a number of other embodiments. For example, the turbine 7 may be employed to drive a centrifugal pump wherein the turbine and centrifugal pump are so designed as to be effective in attaining and maintaining the desired pressure and oil in the reservoir but are non-operating or idling during operation of the engine after the desired pressure in the reservoir has been attained. Also there may be employed in lieu of the pumping system shown in the drawing a compound piston type pump actuated by pressure of oil from the conventional engine lubricating system on the driving piston, the driven piston pumping oil into the reservoir from the conventional lubricating system preferably at a greater than normal lubricating pressure but ceasing to operate against a back pressure in excess of the desired oil pressure in the reservoir. Moreover, it will be understood that pump 8 or a pump of whatever form in lieu thereof may be driven by an electrical motor operated from the engine battery, operation of the motor being controlled by a pressure responsive and limiting pressure cut-off means whereby the motor drives the pump to attain and maintain the desired pressure of oil in the reservoir but is stopped upon attainment of that desired pressure therein. Similar pressure responsive and limiting pressure cut-off means may be impressed on any other type of pump drive, as for example hydraulic or pneumatic drives. It will also be understood that for the pumping system shown in the drawing there may be substituted a pump operated directly by the engine, its operation being initiated by pressure responsive means and cut-off by pressure limiting pressure responsive means upon attainment of the desired pressure of oil in the reservoir.

In any case the pumping means of this invention should comprise a pressure controlled pump wherein said pressure control includes pressure responsive and limiting pressure cut-off and is thus effective to interrupt substantial pumping action of the pump upon attainment of the desired predetermined pressure in the reservoir.

To facilitate rapid restarting of an engine which has been recently stopped, without the delay required for releasing oil from reservoir 2 and under circumstances where pre-oiling is not required, one of the contact arms 37 or 39 may be formed of temperature sensitive material and be located in proximity to a portion of the engine which is normally heated during engine operation. In the preferred embodiment, shown by Fig. 1 of the drawing, contact arm 39 is formed from a bi-metallic strip and is located on, or adjacent the engine block whereby normal engine heat causes the arm 39 to bend upwardly to maintain closure of contacts 36 so long as the engine is hot, regardless of the oil pressure in pipe line 3 operating on the pressure responsive means 35. By this arrangement closure of the starting switch S whenever the engine is hot results in immediate actuation of the starter relay and starter motor, without delay required for releasing the charge of oil in the reservoir. Alternatively, a bi-metallic element may be incorporated in contact arm 37 for this purpose, or both arms 37 and 39 may be formed of temperature responsive materials to effect this end.

It will thus be seen that the objects set forth above, among those made apparent from the preceding description, are efficiently attained. Since certain changes may be made in carrying out the above method and in the construction set forth, without departing from the scope of the invention, it is intended that all matter contained in the above description or shown in the accompanying drawing shall be interpreted as illustrative and not in a limiting sense.

It is also be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Pre-starting lubrication apparatus for internal combustion engines comprising in combination with an internal combustion engine a pressure storage, expulsive delivery reservoir adapted for storage of a quantity of lubricating oil under pressure; conduit means connecting said reservoir with parts of said engine to be lubricated; a solenoid valve in said conduit biased to closed position; conventional engine electrical starting circuit including a starter switch and a source of electrical energy; said starter switch having an open and closed position; a solenoid valve circuit including said starting switch and source of electrical energy to actuate said valve to open position when said starter switch is closed; and pressure-operated switch means in said starting circuit fluid-connected to said reservoir responsive to predetermined higher pressure in the latter to hold it and consequently said starting circuit open until certain release of pressure in said reservoir through said valve upon energization of the latter to open position, said pressure-operated switch being biased toward closed position automatically to close said starting circuit when the reservoir pressure is reduced to a predetermined value by such pressure release.

2. Pre-starting lubrication apparatus for internal combustion engines comprising, in combination; an internal combustion engine having a pressure lubricating system; a pressure storage, expulsive delivery reservoir adapted for storage under predetermined pressure of a quantity of lubricating oil; engine-driven means to supply lubricating oil from said system to said reservoir when the pressure in the latter drops below a predetermined value; lubricant-supply conduit means connecting said reservoir to said system to lubricate parts of said engine; a conventional engine electrical starting circuit including a starter switch and a source of electrical energy; a valve control circuit including said energy source and starter switch; an electrically actuated valve controlling oil flow in said conduit means and electrically connected in said valve control circuit, said valve being closed when said control circuit is deenergized by open condition of said starter switch and opened by electrical energization of said control circuit through said starter switch when closed; pressure-operated switch means in said starting circuit responsive to relatively lower pressure to close said starting circuit, said latter switch means holding said starting circuit open at relatively higher pressure; and conduit means fluid-connecting said pressure operated switch means to said reservoir whereby the former is responsive to the pressure prevailing in the latter.

3. The pre-starting engine lubricating apparatus as defined in claim 2 characterized by said engine-driven lubricating oil supply means as comprising pressure-controlled pumping means connected between said engine lubricating system and said reservoir responsive to a relatively low differential between the pressures therein to pump oil from the former into the latter and at a relatively higher differential between those pressures to cease such pumping transfer.

4. Pre-starting engine lubrication apparatus according to claim 3 characterized in that said pressure controlled pumping means comprises in combination a turbine driven by oil pressure from the engine lubrication system of said engine and a gear pump driven by said turbine to transfer oil from the engine lubrication system to said reservoir under a pressure greater than the pressure present in the engine lubrication system during operation of the engine.

5. The pre-starting engine lubricating apparatus as defined in claim 2 characterized by said pressure-operated switch means as including a movable contact and a heat-responsive thermal means supporting said movable contact and mounted in heat transfer relation to said engine, said thermal means when heated to and above a selected temperature effecting and maintaining closure of said switch means in opposition to the pressure response thereof tending otherwise to open and hold open said switch means at relatively high pressure, whereby when the engine is at selected heat said pressure-responsive switch means is held closed.

6. Pre-starting apparatus as defined in claim 5 characterized by the heat responsive means being a heat responsive bimetallic strip.

References Cited in the file of this patent

UNITED STATES PATENTS

| | | |
|---|---|---|
| 2,273,888 | Paulsen | Feb. 24, 1942 |
| 2,326,167 | Piquerez | Aug. 10, 1943 |

FOREIGN PATENTS

| | | |
|---|---|---|
| 570,477 | Great Britain | July 9, 1945 |